US012759536B2

(12) United States Patent
Jung et al.

(10) Patent No.: US 12,759,536 B2
(45) Date of Patent: Oct. 13, 2026

(54) METHOD AND APPARATUS FOR AUTONOMOUS PARKING CONTROL

(71) Applicants: Hyundai Motor Company, Seoul (KR); Kia Corporation, Seoul (KR)

(72) Inventors: Eun Seok Jung, Seongnam-Si (KR); Dong Cheol Park, Suwon-Si (KR); Dong Hyuk Kim, Incheon (KR); Sung Yeon Kim, Suwon-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/970,139

(22) Filed: Dec. 5, 2024

(65) Prior Publication Data

US 2025/0289412 A1 Sep. 18, 2025

(30) Foreign Application Priority Data

Mar. 13, 2024 (KR) ........................ 10-2024-0034916

(51) Int. Cl.

*B60W 30/00* (2006.01)
*B60W 10/00* (2006.01)
*B60W 10/20* (2006.01)
*B60W 30/06* (2006.01)
*B60W 60/00* (2020.01)

(52) U.S. Cl.

CPC ............ *B60W 30/06* (2013.01); *B60W 10/20* (2013.01); *B60W 60/001* (2020.02); *B60W 2552/00* (2020.02); *B60W 2710/205* (2013.01); *B60W 2710/207* (2013.01)

(58) Field of Classification Search

CPC .... B60W 30/06; B60W 60/001; B60W 10/20; B60W 2552/00; B60W 2710/205; B60W 2710/207

USPC ............................................................ 701/26

See application file for complete search history.

(56) References Cited

U.S. PATENT DOCUMENTS

| | | | | |
|---|---|---|---|---|
| 2016/0257303 | A1* | 9/2016 | Lavoie | B60W 10/20 |
| 2020/0130698 | A1* | 4/2020 | Miyahara | B60W 40/06 |
| 2020/0262417 | A1 | 8/2020 | Huger et al. | |
| 2021/0146915 | A1* | 5/2021 | Niewiadomski | G06T 7/13 |

FOREIGN PATENT DOCUMENTS

| | | | | |
|---|---|---|---|---|
| CN | 113602258 A | * 11/2021 | | B60W 50/00 |
| DE | 102019111502 A | 11/2020 | | |

OTHER PUBLICATIONS

English Translation of CN113602258 (Year: 2021).*

* cited by examiner

*Primary Examiner* — Tiffany P Young

(74) *Attorney, Agent, or Firm* — MORGAN, LEWIS & BOCKIUS LLP

(57) ABSTRACT

A method for an autonomous parking control apparatus includes determining whether a curb exists in an autonomous parking space for a vehicle; storing a position of the curb when the curb exists; determining whether steering control of the vehicle is required at the curb; and controlling autonomous parking of the vehicle by adjusting Motor Driven Power Steering (MDPS) steering angle to 0° when no steering control is required at the curb.

10 Claims, 6 Drawing Sheets

METHOD AND APPARATUS FOR AUTONOMOUS PARKING CONTROL

CROSS-REFERENCE TO RELATED APPLICATION

The present application claims priority to Korean Patent Application No. 10-2024-0034916, filed on Mar. 13, 2024, the entire contents of which is incorporated herein for all purposes by this reference.

BACKGROUND OF THE PRESENT DISCLOSURE

Field of the Present Disclosure

The present disclosure relates to an autonomous parking control method and apparatus.

Description of Related Art

The contents described below merely provide background information related to the present disclosure and do not form related art.

As part of autonomous driving technology, there is autonomous parking. Autonomous parking is a technology that controls a vehicle to park itself in a designated parking space. There are two ways to perform autonomous parking: Remote Smart Parking Assist (RSPA) and RSPA 2. RSPA allows a vehicle to park itself using a smart key outside the vehicle, providing convenience to the driver and passenger in places where getting on or off is difficult, such as narrow parking spaces. RSPA 2 is a method that utilizes sensors to recognize parking spaces and then automatically controls steering/driving/braking to complete parking in the recognized parking space.

FIG. 1 is an exemplary diagram showing an autonomous parking control situation in a parking environment with a curb.

Obstacles when parking may be, for example, a wall, pillar, speed bump, guard rail, curb, parked vehicle, or the like. For example, in Europe, people park across a curb 110.

In a parking environment with a curb, the vehicle may not have enough driving power to drive over the curb. Therefore, when the height of the curb is high, there is a problem in that the autonomous parking function is disabled due to insufficient driving force of the vehicle.

Meanwhile, Motor Driven Power Steering (MDPS) refers to a power steering operation method that utilizes the power source of steering assistance as the assistance of an electric motor. MDPS is also called Electronic Power Steering (EPS). In a parking environment with a curb, there may be a driver override misjudgment in MDPS. That is, in a parallel parking situation on a curb, the corresponding parking space is recognized using a sensor, and during autonomous parking control, as shown in reference numeral 130 in FIG. 1, a steering wheel (mainly front wheel) tires comes into contact with the curb 110 and reverse torque is generated, so MDPS determines that it is a driver override and the autonomous parking function is disabled.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus for controlling autonomous parking without performance degradation in a parking environment with a curb.

The present disclosure provides a method and apparatus for controlling autonomous parking that provides convenience to a driver in a parking environment with a curb.

The objects to be achieved by the present disclosure are not limited to the objects mentioned above, and other objects not mentioned will be clearly understood by one of ordinary skill in the art from the description below.

According to an exemplary embodiment of the present disclosure, a method for an autonomous parking control apparatus includes determining whether a curb exists in an autonomous parking space for a vehicle; storing a position of the curb when the curb exists; determining whether steering control of the vehicle is required at the curb; and controlling autonomous parking of the vehicle by adjusting Motor Driven Power Steering (MDPS) steering angle to 0° when no steering control is required at the curb.

According to an exemplary embodiment of the present disclosure, an apparatus for an autonomous parking control includes a memory including instructions; and processor configured to perform: determining whether a curb exists in an autonomous parking space for a vehicle; storing a position of the curb when the curb exists; determining whether steering control of the vehicle is required at the curb; and controlling autonomous parking of the vehicle by adjusting Motor Driven Power Steering (MDPS) steering angle to 0° when no steering control is required at the curb.

The autonomous parking control method and apparatus according to an exemplary embodiment of the present disclosure enables autonomous parking without performance degradation in a parking environment with a curb.

The autonomous parking control method and apparatus according to an exemplary embodiment of the present disclosure can provide convenience to a user by controlling autonomous parking in a parking environment with a curb.

The autonomous parking control method and apparatus according to an exemplary embodiment of the present disclosure enables autonomous parking control in a parking environment with a curb without braking control of each wheel.

The effects of the present disclosure are not limited to the effects mentioned above, and other effects not mentioned will be clearly understood by one of ordinary skill in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
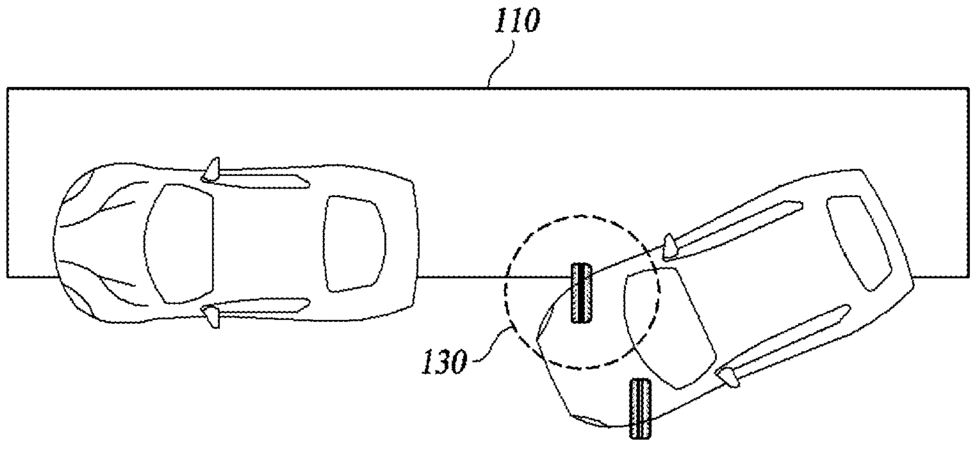
FIG. 1 is an exemplary diagram showing an autonomous parking control situation in a parking environment with a curb.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure are described in detail with reference to the accompanying drawings. In the following description, like reference numerals refer to like elements even though the elements are shown in different drawings. Furthermore, in the following description of the embodiments, a detailed description of known functions and configurations incorporated therein have been omitted for clarity and for brevity.

Furthermore, terms such as first, second, A, B, (a), (b) may be used to describe components of the present disclosure. These terms are intended only to distinguish one component from another, and the nature, sequence, or order of the components is not limited by the terms. Throughout the specification, whenever any part is said to “include” or “comprise” any component, it is meant to be inclusive of other components, not exclusive of other components, unless specifically stated to the contrary. Furthermore, terms such as “~part,” “module,” and the like in the specification refer to a unit that handles at least one function or operation, which may be implemented in hardware or software or a combination of hardware and software. When a controller, component, device, element, part, unit, module, or the like of the present disclosure is described as having a purpose or performing an operation, function, or the like, the controller, component, device, element, part, unit, or module should be considered herein as being “configured to” meet that purpose or perform that operation or function. Each controller, component, device, element, part, unit, module, and the like may separately embody or be included with a processor and a memory, such as a non-transitory computer readable media, as part of the apparatus.

The following detailed description, together with the accompanying drawings, is intended to illustrate exemplary embodiments of the present disclosure and is not intended to represent the only embodiments in which the present disclosure may be practiced.

Figure 2:
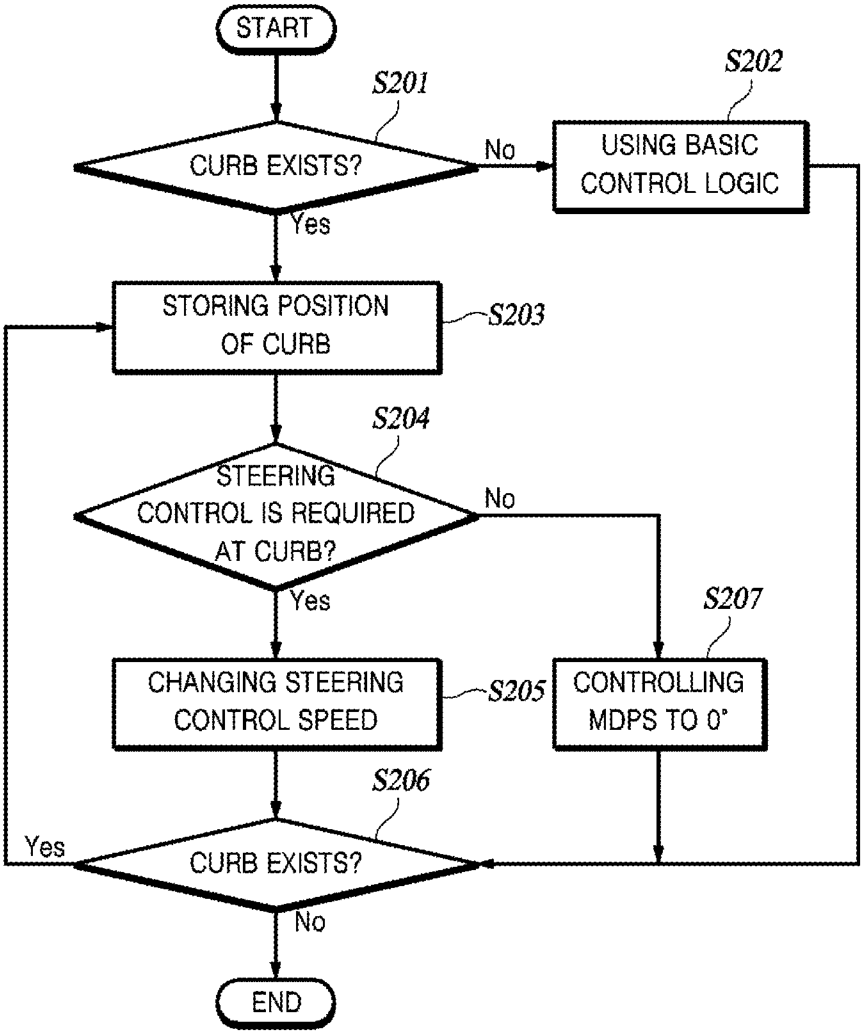
FIG. 2 is a flowchart showing an autonomous parking control method according to an exemplary embodiment of the present disclosure.

FIG. 2 is a flowchart showing an autonomous parking control method according to an exemplary embodiment of the present disclosure.

Before performing the operation of FIG. 2, it is assumed that an autonomous parking control apparatus detects a space around a vehicle, generates local map data, and detects an available parking space (or target location) based on the local map data. The available parking space (or target location) refers to the location where the vehicle can enter by turning the steering wheel during autonomous parking. The autonomous parking in FIG. 2 is illustrated as an example of parallel parking, but is not limited thereto.

When an available parking space is identified in step 201, the autonomous parking control apparatus is configured to determine whether a curb exists in the available parking space.

The autonomous parking control apparatus is configured to determine whether a curb exists in the available parking space based on at least one of an amount of decrease in vehicle speed, a slope of decrease in the vehicle speed, and a change in value of a wheel direction sensor. For example, the autonomous parking control apparatus is configured to determine that vehicle control is impossible due to the curb when the vehicle speed is maintained at about 0 km/h during control and the value of the wheel direction sensor changes from the previous moving direction.

If there is no curb, the autonomous parking control apparatus is configured to perform autonomous parking using basic control logic in step 202.

On the other hand, if a curb exists, the autonomous parking control apparatus stores the position of the curb in step 203. The position of the curb may be identified through the wheel direction sensor. The position of the curb is stored, for example, in a form of coordinates (x, y). Furthermore, when storing the curb position, the autonomous parking control apparatus also stores curb position storage amount, curb position correction amount, and curb slope value estimated by accumulating two points of the curb position.

The curb position storage amount refers to the stored value of the detected curb position information, used to continuously record the curb’s location over time, allowing for tracking of the curb’s shape or changes.

The curb position correction amount is the calculated value used to correct the difference between the actual position of the curb and its detected position. The curb position correction amount is utilized to adjust the curb position information more accurately.

The curb position 2-point refers to the measured values of two key points (e.g., the start and end or specific points of the curb) used to understand the curb’s slope or curve, allowing for more precise estimation of the curb’s inclination or shape.

The curb slope value is the estimated actual slope (inclination) of the curb, derived by accumulating the curb position 2-points, serving as a crucial factor in controlling the accurate position and movement of the vehicle during autonomous parking.

Thereafter, in step 204, the autonomous parking control apparatus is configured to determine whether steering control of the vehicle is required at the curb.

If steering control is required at the curb, the autonomous parking control apparatus changes the steering control speed in step 205. In the instant case, the autonomous parking control apparatus is configured for controlling autonomous parking using a steering control speed of about 30% of the previous steering speed at the corresponding location. The 30% is an arbitrary value and the present disclosure is not limited thereto.

While steering, a situation occurs where the vehicle gets stuck on the curb and the motor loses power, resulting in reverse torque. In the instant case, when a steering control speed of about 30% of the previous steering speed is used, the reverse torque applied to the MDPS may be offset. Therefore, if the autonomous parking control apparatus controls autonomous parking using a steering control speed of about 30% of the previous steering speed at the corresponding location, autonomous parking may be achieved at the desired location and reverse torque may not occur.

The process of changing the steering control speed will be explained with reference to FIG. 3 and FIG. 4, which will be described later.

On the other hand, if steering control is not required at the curb in step 204, the autonomous parking control apparatus proceeds to step 207 and is configured to control MDPS to 0° without torque control. The control of MDPS to 0° means controlling MDPS steering angle to 0° and means that the steering wheel is centered.

The control of MDPS to 0° will be explained with reference to FIG. 5, which will be described later.

After operations of steps 205 and 206, the autonomous parking control apparatus is configured to determine again whether a curb exists in step 206.

If there is no curb, the autonomous parking control apparatus terminates the process. On the other hand, if a curb exists, the autonomous parking control apparatus returns to step 203.

Figure 3:
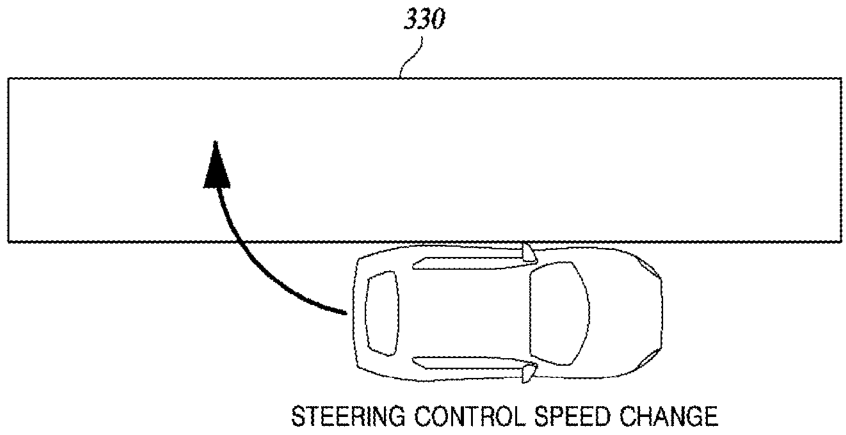
FIG. 3 is a first exemplary diagram showing the autonomous parking control method according to the exemplary embodiment of the present disclosure.

FIG. 3 is a first exemplary diagram showing the autonomous parking control method according to the exemplary embodiment of the present disclosure.

If steering control is required at the curb in step 205 of FIG. 2, the autonomous parking control apparatus autonomously parks the vehicle to a curb 330 from the vehicle's position in FIG. 3 at a steering control speed of about 30% of the previous steering speed.

Figure 4A:
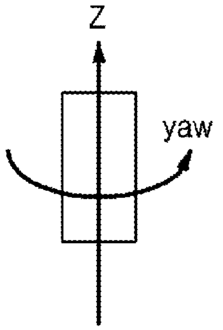
FIG. 4A, FIG. 4B and FIG. 4C are exemplary diagrams showing the characteristics of a tire applied to the exemplary embodiment of the present disclosure.
Figure 4B:
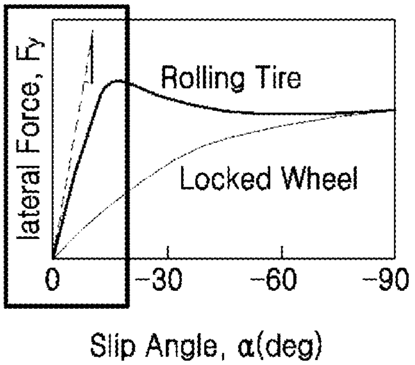
Figure 4C:
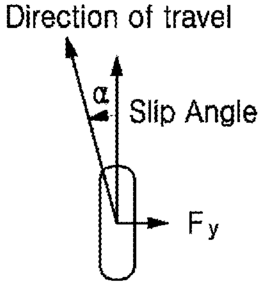

Referring to FIGS. 4A through 4C, the reasons why curbs may be overcome by changing the steering control speed are as follows.

FIG. 4A, FIG. 4B and FIG. 4C are exemplary diagrams showing the characteristics of a tire applied to the exemplary embodiment of the present disclosure.

FIG. 4A shows yaw, which is the rotation of the vehicle body around the vertical direction (z-axis direction) of the vehicle.

FIG. 4B is a graph showing the relationship between lateral force and slip angle in the cases of a rolling tire and a locked wheel.

The slip angle represents the angle formed between the moving direction of the vehicle's wheel and the center plane of the wheel. The slip angle may be detected by measuring the lateral speed of the vehicle through a vehicle sensor, or may be estimated using the yaw rate, as shown in FIG. 4A.

The lateral force represents the value obtained by multiplying the slip angle and a lateral force coefficient. The lateral force is perpendicular to the moving direction of the wheel, and depending on the centrifugal force, a difference in load between the left and right wheels occurs and the lateral force changes.

Referring to FIG. 4B, the curve of the locked wheel shows a gentle curve shape.

When a vehicle turns, lateral forces are generated in the tires and a slip angle appears at each wheel. Referring to FIG. 4B, the curve for the rolling tire shows a curve shape that peaks within slip angle −30 degrees and then declines.

Through FIG. 4C, the direction of tire movement may be identified through lateral force and slip angle. The lateral force of the tire is called the cornering force Fy when the camber angle is 0 degrees, and when the slip angle is small, the relationship between the lateral force and the slip angle is linear, as shown in FIG. 4B.

Depending on the characteristics of the tire, a torque [N-m (Newton-meter)] required to twist the tire is proportional to a displacement. Since the driver's will judgment conditions need to be maintained according to ACSF Cat.A (Automatically commanded Steering Function category A), the amount of torque used for control needs to be distinguished from the amount of torque used for the driver's will judgment. Therefore, control needs to be performed by reducing the value of the torque-generating force F, and by varying the steering control speed a to reduce the force F, it is possible to overcome a curb while being distinguished from the driver's will judgment conditions. By use of a steering control speed of 30% of the previous steering control speed, steering control may be performed while satisfying ACSF Cat.A. In the instant case, ACSF Cat.A refers to European legislation for autonomous vehicles that requires a function to operate at speeds of 10 km/h or less to assist the driver when required during low-speed driving or parking driving, and to be deactivated by the driver at any time in case of system override.

For reference, if steering control is required, but the steering control speed cannot be controlled, another control is required to avoid ACSF Cat.A at the boundary between the curb and the road.

Figure 5:
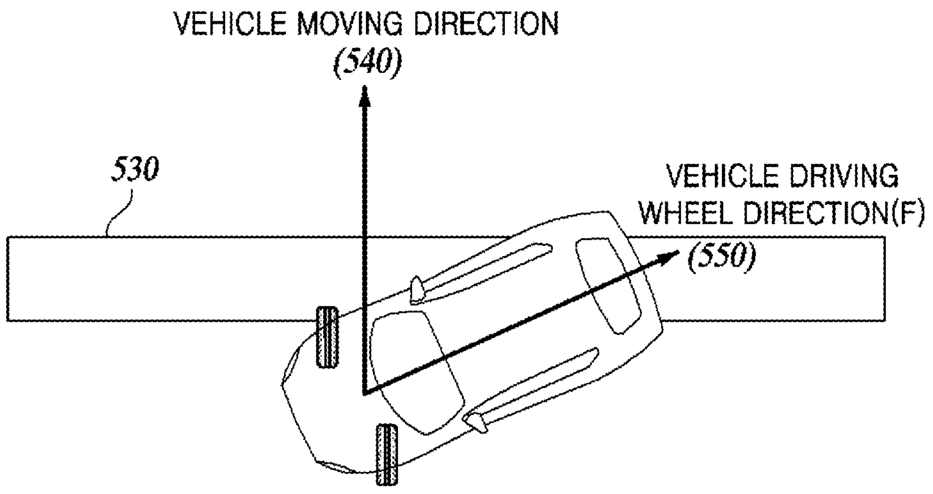
FIG. 5 is a second exemplary diagram showing the autonomous parking control method according to the exemplary embodiment of the present disclosure.

FIG. 5 is a second exemplary diagram showing the autonomous parking control method according to the exemplary embodiment of the present disclosure.

If no steering control is required at the curb in step 207 of FIG. 2, autonomous parking is controlled through MDPS 0° control.

The reasons why it is possible to overcome curbs with the same engine output through MDPS 0° control are as follows. First, as shown in FIG. 5, assume that a curb 530 and the front wheels are at an angle of 90 degrees.

Referring to FIG. 5, when the curb 530 exists, a force loss equal to the vector formed by a vehicle driving wheel direction (direction of force) 550 and a vehicle moving direction 540 occurs during autonomous parking. The force loss may be expressed as $F_{loss}=F(1-\cos\theta)$. Therefore, the autonomous parking control apparatus according to the exemplary embodiment of the present disclosure can minimize the occurrence of force loss by making the vehicle moving direction and the vehicle driving wheel moving direction the same through MDPS 0° control. In other words, the autonomous parking control apparatus according to the exemplary embodiment of the present disclosure matches the vehicle moving direction and the vehicle driving wheel moving direction through MDPS 0° control. Alternatively, the autonomous parking control apparatus according to the exemplary embodiment of the present disclosure matches the wheel angle and the vehicle moving direction through MDPS 0° control.

In summary, in the exemplary embodiment of the present disclosure, the position coordinates (x, y) of the curb determined by a curb determination logic are stored, and when steering control is required, the steering control speed is changed at the corresponding position as in step 205 of FIG. 2, or when no steering control is required, MDPS 0° control is performed as in step 207.

Figure 6:
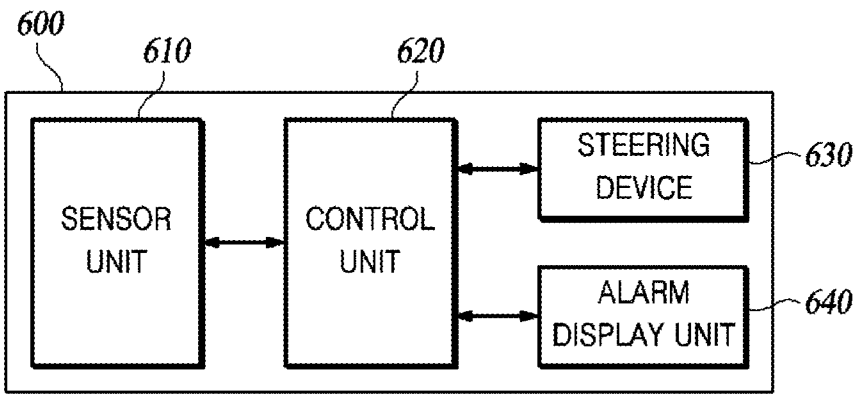
FIG. 6 is a block diagram of an autonomous parking control apparatus according to an exemplary embodiment of the present disclosure.

FIG. 6 is a block diagram of an autonomous parking control apparatus according to an exemplary embodiment of the present disclosure.

The autonomous parking control apparatus 600 includes a sensor unit 610, a control unit 620, a steering device 630, and an alarm display unit 640.

The sensor unit 610 is provided in a vehicle to obtain various information necessary for autonomous driving and provide it to the control unit 620.

The control unit 620 utilizes data provided from the sensor unit 610 to perform the autonomous parking control according to the exemplary embodiment of the present disclosure shown in FIG. 2, FIG. 3, FIG. 4 and FIG. 5. The control unit 620 includes all of the functions of the basic control logic and the curb determination logic described above.

The steering device 630 is configured to control the steering of the vehicle and is implemented as MDPS. The steering device 630 is configured to control the steering angle of the vehicle according to the control of the control unit 620.

The alarm display unit 640 displays various notification information for autonomous parking. The alarm display unit 640 may provide various notification information for autonomous parking using a visual output device. The visual output device includes Center Infotainment Display (CID), cluster, Rear Seat Entertainment (RSE), Head Up Display (HUD), and the like.

The CID communicates with navigation, mobile and audio systems to provide vehicle driving information and entertainment.

The cluster provides information necessary for driving, such as the vehicle's driving speed, RPM, fuel level, and collision warning.

The RSE is a display mainly used for entertainment activities for the vehicle's rear seat occupants, and also provides information on the vehicle's driving status and navigation.

The HUD projects the vehicle's current speed, remaining fuel level, and navigation information as graphic images on the windshield in front of the driver. However, the visual output device is not limited to the above and may include any device that can provide visual information.

Figure 7:
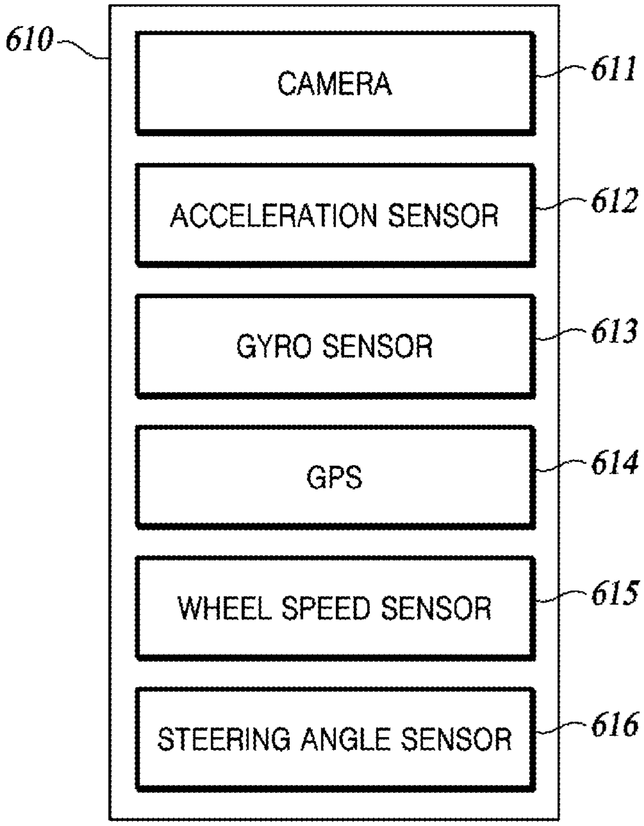
FIG. 7 is a detailed block diagram of a sensor unit according to the exemplary embodiment of the present disclosure.

FIG. 7 is a detailed block diagram of the sensor unit 610 according to the exemplary embodiment of the present disclosure.

The sensor unit 610 according to the exemplary embodiment of the present disclosure is for collecting in-vehicle information and out-of-vehicle information, and the in-vehicle information refers to information measured by various sensors provided in the vehicle, such as a pedal response sensor, wheel speed sensor, wheel hydraulic pressure sensor, lateral acceleration sensor, turning angle sensor, steering angle sensor, etc. The out-of-vehicle information refers to information collected by Radio detection and ranging (RADAR), LiDAR, image sensors, Global Positioning System (GPS), navigation, etc. to recognize obstacles or lanes in the road on which the autonomous vehicle is driving or to determine the driving path of the autonomous vehicle. In the exemplary embodiment of the present disclosure, the sensor unit 610 may include a camera 611 for obtaining images of the exterior of the vehicle, including curbs, an acceleration sensor 612 for detecting changes in speed in the longitudinal and/or lateral directions of the vehicle, a gyro sensor 613 provided and distributed in specific parts of the vehicle to measure an angle when the vehicle turns according to the steering, a GPS 614 for obtaining current location information of the vehicle, a wheel speed sensor 615 provided individually on each wheel to measure the speed of the wheels of the driving vehicle, a steering angle sensor 616 which is configured for measuring current steering angle, which is the actual rotation angle of the wheel, to directly measure how much the wheel has rotated. Furthermore, the sensor unit 610 may include various sensors such as a tire air pressure sensor, a temperature sensor, a torque sensor, a motor torque sensor, etc.

At least some of the components described in the exemplary embodiments of the present disclosure may be implemented as hardware elements, including at least one of a digital signal processor (DSP), a processor, a controller, an application-specific IC (ASIC), a programmable logic device (e.g., FPGA, etc.), and other electronic devices, or a combination thereof. Furthermore, at least some of the functions or processes described in the exemplary embodiments of the present disclosure may be implemented as software, and the software may be stored in a recording medium. At least some of the components, functions, and processes described in the exemplary embodiments of the present disclosure may be implemented as a combination of hardware and software.

Methods according to the exemplary embodiments of the present disclosure may be written as a program which may be executed on a computer, and may also be implemented in various recording mediums such as a magnetic storage medium, an optical read medium, a digital storage medium, and the like.

Implementations of the various techniques described herein may be realized by digital electronic circuitry, or by computer hardware, firmware, software, or combinations thereof. Implementations may be made as a computer program tangibly embodied in a computer program product, i.e., an information carrier, e.g., machine-readable storage device (computer-readable medium) or a radio signal, for processing by or for controlling the operation of a data processing device, e.g., a programmable processor, a computer, or multiple computers. Computer programs, such as the computer program(s) described above, may be written in any form of programming language, including compiled or interpreted languages, and may be deployed in any form as a stand-alone program or as a module, component, subroutine, or other units suitable for use in a computing environment. The computer program may be deployed to be processed on one computer or multiple computers at one site or distributed across multiple sites and developed and interconnected through a communications network.

Processors suitable for processing computer programs include, for example, both and special-purpose microprocessors, and any one or more processors of any type of digital computer. Typically, a processor will receive instructions and data from read-only memory or random access memory, or both. Elements of the computer may include at least one processor that executes instructions and one or more memory devices that store instructions and data. In general, the computer may include one or more mass storage devices that store data, such as magnetic disks, magneto-optical disks, or optical disks, or may be coupled to the mass storage devices to receive data therefrom and/or transmit data thereto. Information carriers suitable for embodying computer program instructions and data include, for example, semiconductor memory devices, magnetic mediums such as hard disks, floppy disks, and magnetic tapes, optical mediums such as Compact Disk Read Only Memory (CD-ROM), Digital Video Disk (DVD), magneto-optical mediums such as floptical disk, Read-Only Memory (ROM), Random Access Memory (RAM), flash memory, Erasable Programmable ROM (EPROM), and Electrically Erasable Programmable ROM (EEPROM). The processor and memory may be supplemented by or included in special purpose logic circuitry.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor operatively connected to the memory and configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well-known to a person including ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous parking control method comprising:
- determining, by a processor, whether a curb exists along a path toward a parking space;
- upon determining that the curb exists, determining, by the processor, that control of a vehicle is hindered by the curb when a vehicle speed is less than a threshold and a change in a wheel direction sensor value is detected;
- storing, by the processor, a position of the curb;
- determining, by the processor, whether steering control of the vehicle is required while at least one wheel of the vehicle is in contact with the curb; and
- upon determining that no steering control is required, controlling, by the processor, autonomous parking of the vehicle by adjusting a steering angle of a Motor Driven Power Steering (MDPS) to 0°.

2. The autonomous parking control method of claim 1, further including:
- controlling, by the processor, the autonomous parking by reducing a steering control speed of the vehicle by an arbitrary percentage of a previous steering speed upon concluding that the steering control is required at the curb.

3. The autonomous parking control method of claim 2, wherein the controlling of the autonomous parking by reducing the steering control speed of the vehicle by the arbitrary percentage of the previous steering speed includes offsetting torque caused by a repulsive force of the curb and a wheel of the vehicle.

4. The autonomous parking control method of claim 1, wherein the storing of the position of the curb includes storing at least one of coordinates (x, y) indicating the position of the curb, a storage amount of the curb position, a correction amount of the curb position, and a slope of the curb.

5. The autonomous parking control method of claim 1, wherein the position of the curb is identified using a wheel direction sensor.

6. An autonomous parking control apparatus comprising:
- a memory including instructions; and
- a processor operatively connected to the memory and configured to:
- determine whether a curb exists along a path toward a parking space;
- upon determining that the curb exists, determine that control of a vehicle is hindered by the curb when a vehicle speed is less than a threshold and a change in a wheel direction sensor value is detected;
- store a position of the curb
- determine whether steering control of the vehicle is required while at least one wheel of the vehicle is in contact with the curb; and
- upon determining that no steering control is required, control autonomous parking of the vehicle by adjusting a steering angle of a Motor Driven Power Steering (MDPS) to 0°.

7. The autonomous parking control apparatus of claim 6, wherein the processor is further configured to control the autonomous parking by reducing a steering control speed of the vehicle by an arbitrary percentage of a previous steering speed upon concluding that the steering control is required at the curb.

8. The autonomous parking control apparatus of claim 7, wherein the processor offsets torque caused by a repulsive force of the curb and a wheel of the vehicle by reducing the steering control speed of the vehicle by an arbitrary percentage of the previous steering speed.

9. The autonomous parking control apparatus of claim 6, wherein the processor stores at least one of coordinates (x, y) indicating the position of the curb, a storage amount of the curb position, a correction amount of the curb position, and a slope of the curb.

10. The autonomous parking control apparatus of claim 6, wherein the position of the curb is identified using a wheel direction sensor.

* * * * *